I. W. Boatman.
Scraper.
Nº 85,635.    Patented Jan. 5, 1869.
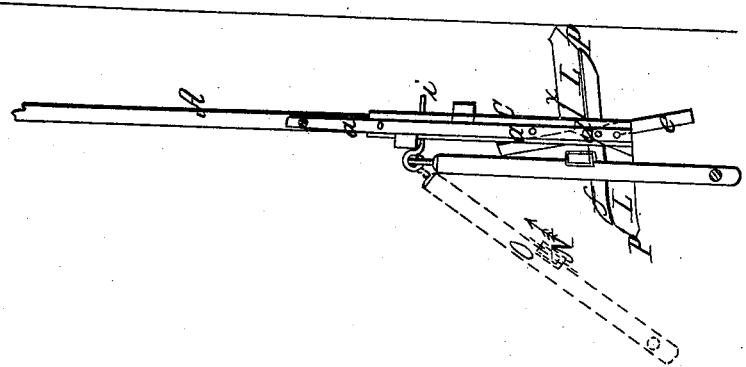
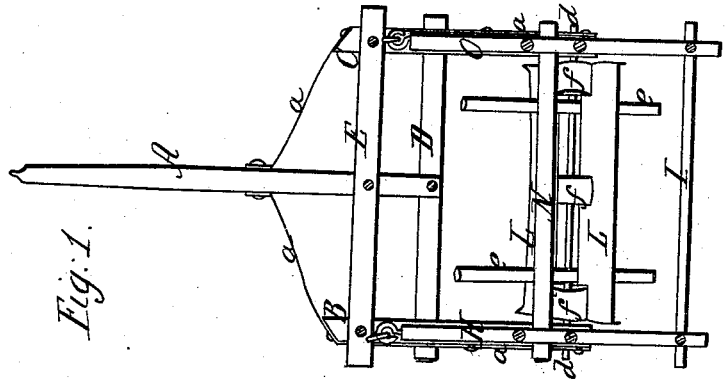
Witnesses;
H. P. K. Peck
B. P. Lucas
Inventor;
Isaac W. Boatman
by his atty
H. P. K. Peck

UNITED STATES PATENT OFFICE.

ISAAC W. BOATMAN, OF SEVEN MILE, OHIO, ASSIGNOR TO HIMSELF AND JOHN M. BOATMAN, OF PERU, INDIANA.

IMPROVED SCRAPER.

Specification forming part of Letters Patent No. 85,635, dated January 5, 1869.

*To all whom it may concern:*

Be it known that I, ISAAC W. BOATMAN, of Seven Mile, in Butler county, in the State of Ohio, have invented a new and useful Improvement in Scrapers for Earthworks; and I do hereby declare that the following is a full and exact description thereof, reference being had to the accompanying drawings, and to the letters of reference marked thereon.

Figure 1 represents a top view of my improved scraper, and Fig. 2 represents a side elevation of the same.

The parts A B C D E constitute the main frame, the part A of which extends in front to form the tongue for guiding the scraper. This frame is strengthened by suitable flat bars of iron $a\ a$, bolted to the outer sides of the two pieces B C, and also to the tongue A.

An iron axle, $d$, which passes centrally through the two pins or arms $e\ e$ and the three beams $f\ f\ f$, is suitably journaled in the rear ends of the frame-pieces B C, as seen in the drawings.

Upon the opposite sides of the beams $f$ metal scrapers or shovels L are securely bolted. These shovels are formed with suitable flanges at their ends, and their outer edges are bent so as to form an obtuse angle with the bodies of the scrapers, as represented at P in Fig. 2.

The movable frame H I N O is hinged to the main frame by eyebolts $i\ i$, and these bolts may be adjusted, by means of nuts, so as to elevate or depress the front end of this movable frame.

As the scraper may be moved from place to place, with its shovels L L standing in a horizontal plane, the ends of the pins or arms $e\ e$ may be formed with suitable curves, to serve as runners and supports for the entire structure while being moved.

When in use, the scraper stands in the position represented in Fig. 2, with one shovel-edge resting or scraping upon the ground; and when the lower shovel receives its load, and the team conveys it to a place of deposit, the attendant grasps the rear cross-piece, I, of the movable frame, and elevates this frame sufficiently to raise the cross-piece N above the ends of beams $f\ f\ f$, when the shovels and arms $e$ will move upon or with the axle $d$ one-quarter of a revolution, causing the load of earth to be discharged, and in the meantime the attendant will let the movable frame down, so as to cause the cross-piece or stop N to come in contact with the arms $e\ e$, and the team will then convey the scraper to the place to receive its load; and then the attendant again elevates the rear end of the movable frame without stopping the progress of the team, allowing the shovels and arms to make a quarter-revolution, to bring the second scraper into position to receive its load, as in the first instance.

It will be seen that there will be no necessity of stopping the progress of the team for either loading or discharging the shovels.

To give strength to the structure, the iron shovels are not only bolted firmly to the three central beams $f\ f\ f$, but their inner ends are connected together rigidly by the strap-irons $x$, indicated by dotted lines in Fig. 2.

The faces of the beams $f\ f\ f$, against which the central cross-piece N of the movable frame will rest during the loading of the shovels, may be formed with suitable inclined planes to cause the movable frame to be elevated by the force exerted upon its cross-piece N when the machine is progressing and about to discharge a load of earth; but, when these beams are so constructed, the attendant will be required to bear down with his hands upon the rearmost cross-piece, I, of the movable frame during the time of loading and conveying the load to the place of deposit. Also, the inclined form of the faces of the beams will enable the attendant, by elevating or lowering the movable frame, to change and govern the angle at which the shovels will stand while receiving their load of earth. When the earth to be scraped is hard, the shovels should stand at an angle to a horizontal line much less than when receiving or scraping earth that is loose and free.

Having fully described my invention, what I claim, and desire to secure by Letters Patent, is—

1. The combination of the revolving scrapers L L and arms *e e* with the removable frame, arranged and operating in the manner substantially as and for the purpose described.

2. The construction and arrangement of the frames A B C D E and H I N O, in combination with the rotary scrapers and arms, as described.

In testimony whereof I have hereunto set my hand this 26th day of October, A. D. 1867.

ISAAC W. BOATMAN.

Witnesses:
H. P. K. PECK,
H. V. WILLIAMSON.